(12) United States Patent
Mantell et al.

(10) Patent No.: US 10,710,298 B2
(45) Date of Patent: Jul. 14, 2020

(54) SYSTEM FOR REMOVING SUPPORT STRUCTURE USING INTEGRATED FLUID PATHS

(71) Applicant: Xerox Corporation, Norwalk, CT (US)

(72) Inventors: David A. Mantell, Rochester, NY (US); Andrew W. Hays, Fairport, NY (US); Linn C. Hoover, Webster, NY (US); Ron E. Dufort, Rochester, NY (US); Erwin Ruiz, Rochester, NY (US); Patrick J. Howe, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/166,618

(22) Filed: Oct. 22, 2018

(65) Prior Publication Data
US 2019/0054684 A1 Feb. 21, 2019

Related U.S. Application Data (62) Division of application No. 14/937,979, filed on Nov. 11, 2015, now Pat. No. 10,137,632.

(51) Int. Cl.
*B29C 64/112* (2017.01)
*B05B 11/00* (2006.01)
(Continued)

(52) U.S. Cl.
CPC ............ *B29C 64/112* (2017.08); *B05B 11/30* (2013.01); *B29C 64/171* (2017.08); *B29C 64/176* (2017.08); *B29C 64/182* (2017.08); *B29C 64/35* (2017.08); *B29C 64/386* (2017.08); *B29C 64/40* (2017.08); *B29C 71/0009* (2013.01); *B33Y 10/00* (2014.12); *B33Y 30/00* (2014.12);
(Continued)

(58) Field of Classification Search
USPC ....... 118/313, 315, 642–643, 666, 667, 683; 264/297.1, 297.8, 318, 334, 335, 402, 264/489; 134/22.1, 22.18, 34
See application file for complete search history.

(56) References Cited

U.S. PATENT DOCUMENTS

| 4,959,516 A | 9/1990 | Tighe et al. |
| 5,220,346 A | 6/1993 | Carreira et al. |

(Continued)

FOREIGN PATENT DOCUMENTS

| WO | 2014/177823 A1 | 11/2014 |
| WO | 2014/197086 A9 | 12/2014 |

*Primary Examiner* — Yewebdar T Tadesse
(74) *Attorney, Agent, or Firm* — Maginot Moore & Beck LLP (57) ABSTRACT

A system for producing three-dimensional objects forms fluid paths within the support structure to facilitate the removal of the support structure following manufacture of the object. The system includes a first ejector configured to eject a first material towards a platen to form an object, a second ejector configured to eject a second material towards the platen to form support for portions of the object, at least one portion of the support having a body with at least one fluid path that connects at least one opening in the body to at least one other opening in the body, and a fluid source that connects to the at least one fluid path of the support to enable fluid to flow through the at least one fluid path to remove at least an inner portion of the support from the object.

9 Claims, 10 Drawing Sheets

(51) Int. Cl.
    *B33Y 10/00*     (2015.01)
    *B33Y 30/00*     (2015.01)
    *B33Y 80/00*     (2015.01)
    *B33Y 40/00*     (2020.01)
    *B29C 64/171*     (2017.01)
    *B29C 71/00*     (2006.01)
    *B29C 64/176*     (2017.01)
    *B29C 64/182*     (2017.01)
    *B29C 64/40*     (2017.01)
    *B29C 64/35*     (2017.01)
    *B29C 64/386*     (2017.01)
    *B33Y 50/02*     (2015.01)
    *B29K 105/16*     (2006.01)
    *B29C 35/08*     (2006.01)

(52) U.S. Cl.
    CPC ............... *B33Y 40/00* (2014.12); *B33Y 80/00* (2014.12); *B29C 2035/0855* (2013.01); *B29K 2105/162* (2013.01); *B29K 2995/0006* (2013.01); *B33Y 50/02* (2014.12)

(56) References Cited

U.S. PATENT DOCUMENTS

| | | |
|---|---|---|
| 5,422,463 A | 6/1995 | Gooray et al. |
| 5,563,644 A | 10/1996 | Isganitis et al. |
| 5,631,685 A | 5/1997 | Gooray et al. |
| 6,155,331 A | 12/2000 | Langer et al. |
| 6,221,167 B1 | 4/2001 | Karasawa |
| 6,869,559 B2 | 3/2005 | Hopkins |
| 8,459,280 B2 | 6/2013 | Swanson et al. |
| 2003/0222366 A1 | 12/2003 | Stangel et al. |
| 2009/0241997 A1 | 10/2009 | Tafoya |
| 2013/0337277 A1 | 12/2013 | Dikovsky et al. |
| 2014/0048981 A1 | 2/2014 | Crump et al. |
| 2014/0332997 A1 | 11/2014 | Shih et al. |
| 2017/0066197 A1* | 3/2017 | Morikawa ......... C08F 222/1006 |

* cited by examiner

SYSTEM FOR REMOVING SUPPORT STRUCTURE USING INTEGRATED FLUID PATHS

PRIORITY CLAIM

This application is a divisional of and claims priority to U.S. patent application Ser. No. 14/937,979, which is entitled "Method Of Removing Support Structure Using Integrated Fluid Paths," which was filed on Nov. 11, 2015, and which issued as U.S. Pat. No. 10,137,632 on Nov. 27, 2018.

TECHNICAL FIELD

The method disclosed in this document relates to three-dimensional object printing and, more particularly, to removal of support material from printed parts.

BACKGROUND

Digital three-dimensional object manufacturing, also known as digital additive manufacturing, is a process of making a three-dimensional solid object of virtually any shape from a digital model. Three-dimensional object printing is an additive process in which one or more ejector heads eject successive layers of material on a substrate in different shapes. The substrate is supported either on a platform that can be moved three dimensionally by operation of actuators operatively connected to the platform, or the ejector heads are operatively connected to one or more actuators for controlled movement of the ejector heads to produce the layers that form the object. Three-dimensional object printing is distinguishable from traditional object-forming techniques, which mostly rely on the removal of material from a work piece by a subtractive process, such as cutting or drilling.

Manufacturing of three-dimensional printed parts at high speed is a significant challenge because many of the processes involved are time consuming and often done manually. In many three-dimensional object printers, support material is used to enable layers of material to be formed where no surface or previously formed portions of a part exist. Particularly, such printers form support portions using a support material, such as wax, and form portions of an object on top or adjacent to the support portions. After the object is formed, the support material is removed from the object. The support material is typically removed by soaking the object in water, jetting water onto the object, soaking the object in other chemicals, or heating the object. However, each of these methods has limitations that are exacerbated with larger printed objects.

As three-dimensional object printers become larger to enable low to mid volume production runs, multiple parts can be stacked in three-dimensions, separated by support material. However, in such production runs, a substantial amount of support material must be removed during post-processing. What is needed is a method for efficient removal of substantial amounts of support material from printed parts in order to increase overall production speeds.

SUMMARY

A method of manufacturing a three-dimensional object comprises: operating a first ejector of a three-dimensional object printer to eject a first material towards a platen to form an object; operating a second ejector of the three-dimensional object printer to eject a second material towards the platen to form support for portions of the object, at least one portion of the support having a body with at least one fluid path that enables fluid to flow through the body of the support portion and contact a portion of the support material that formed the support; and connecting a fluid source to one end of the at least one fluid path of the support to enable fluid to flow through the at least one fluid path to contact the support material and exit from another end of the at least one fluid path to remove at least an inner portion of the support from the object.

A three-dimensional object printing system comprises: a platen; an ejector head having a first ejector configured to eject a first material towards the platen and a second ejector configured to eject a second material towards the platen; a controller operatively connected to the ejector head, the controller being configured to (i) operate the first ejector to eject the first material towards the platen to form an object, and (ii) operate the second ejector to eject the second material towards the platen to form support for portions of the object, at least one portion of the support having a body with at least one fluid path that enables fluid to flow through the body of the support portion and contact a portion of the support material that formed the support; and a fluid source configured to connect to one end of the at least one fluid path of the support to enable fluid to flow through the at least one fluid path to contact the support material and exit from another end of the at least one fluid path to remove at least an inner portion of the support from the object.

An article of manufacture comprises: an object formed of a first material; and support formed of a second material having a dielectric strength that is higher than a dielectric strength of the first material, the support being configured to support portions of the object, at least one portion of the support having a body with at least one fluid path that enables fluid to flow through the body of the support portion and contact a portion of the support material that formed the support.

BRIEF DESCRIPTION OF THE DRAWINGS

The foregoing aspects and other features of the method and device are explained in the following description, taken in connection with the accompanying drawings.

DETAILED DESCRIPTION

For a general understanding of the environment for the method disclosed herein as well as the details for the method, reference is made to the drawings. In the drawings, like reference numerals designate like elements.

Figure 7:
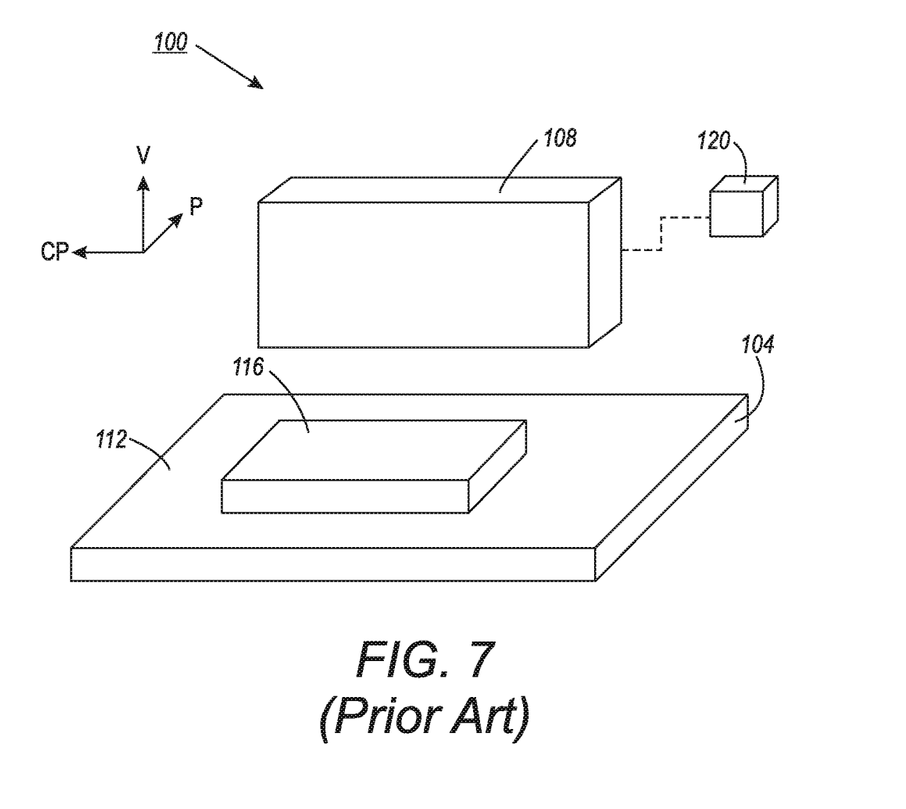
FIG. 7 shows a three-dimensional object printer.

FIG. 7 shows a three-dimensional object printer 100. The printer 100 comprises a platen 104 and an ejector head 108. The ejector head 108 has a plurality of ejectors configured to eject drops of a build material towards a surface 112 of the platen 104 to form a three-dimensional object, such as the part 116. Particularly, the ejector head 108 has a first plurality of ejectors configured to eject drops of a build material to form an object and a second plurality of ejectors configured to eject drops of a support material, such as wax, to form support for the object being formed. As used in this document, "support" means one or more layers of support material that enable layers of a portion of the object to be formed without deformation caused by gravity or laminar flow of the build material. The ejector head 108 is configured to move relative to the platen 104 in the process direction P, the cross-process direction CP, and the vertical direction V. In some embodiments, the printer 100 includes actuators configured to move one or both of the ejector head 108 and the platen 104 with respect to one another.

The printer 100 includes a controller 120 operatively connected to at least the ejector head 108. The controller 120 is configured to operate the ejector head 108 with reference to image data to form a three-dimensional object on the platen surface 112 that corresponds to the image data. To form each layer of the three-dimensional object, the controller 124 operates the printer 100 to sweep the ejector head 108 one or more times in the process direction P, while ejecting drops of material onto the platen 104. In the case of multiple passes, the ejector head 108 shifts in the cross-process direction CP between each sweep. After each layer is formed, the ejector head 108 moves away from the platen 104 in the vertical direction V to begin printing the next layer.

Figure 8:
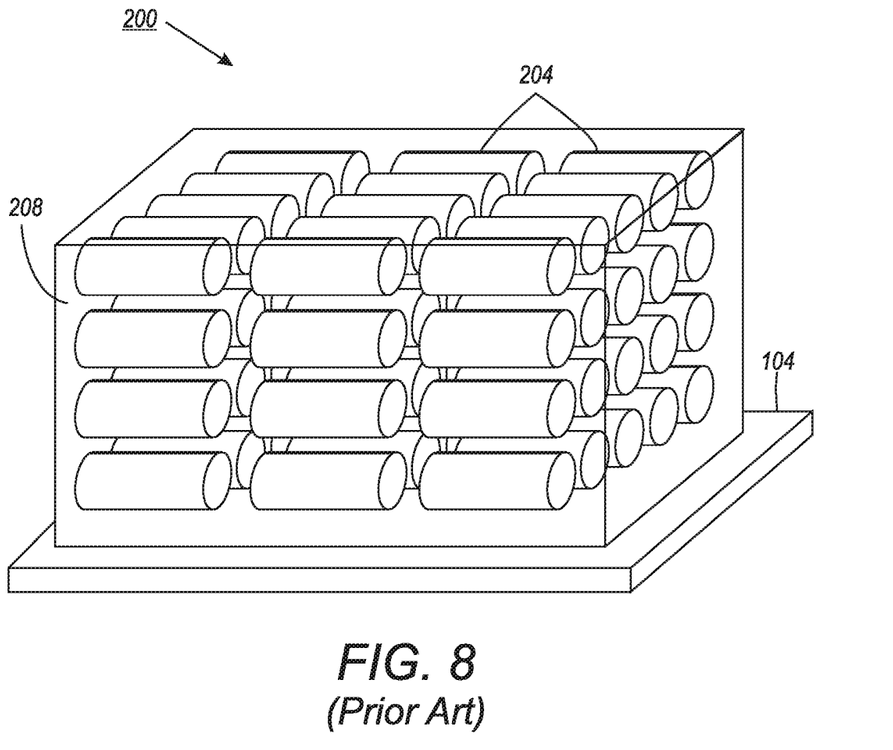
FIG. 8 shows a perspective view of an exemplary block having a plurality of identical parts separated by support material.
Figure 9:
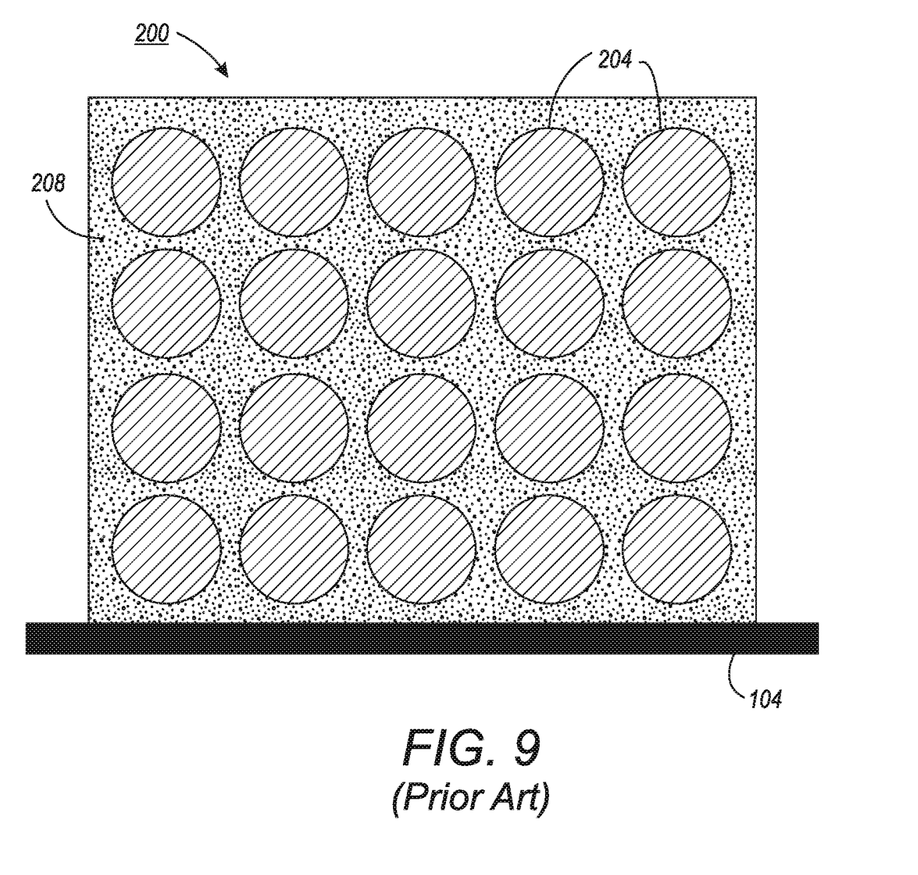
FIG. 9 shows a side view of the block shown in FIG. 8.

In some embodiments, the printer 100 is sufficiently large to enable production runs comprising more than one part. Particularly, a plurality of parts can be printed together in a single block of material, each separated by support material. In some embodiments, the controller 120 receives image data corresponding to a plurality of parts arranged in three-dimensional space with support material arranged between each of the parts to allow the plurality of parts to be printed as a single block. With reference to the image data, the controller 120 operates the ejector head 108 to form the plurality of parts in a single production run. FIG. 8 shows a perspective view of an exemplary block 200 having a plurality of identical parts 204 formed on the platen 104. The parts 204 are essentially arranged in a three-dimensional matrix, evenly spaced throughout the block 200 and separated by support material 208. In other embodiments, the plurality of parts may be different types of parts and may be arranged with respect to one another differently. FIG. 9 shows a side view of the block 200.

Figure 1:
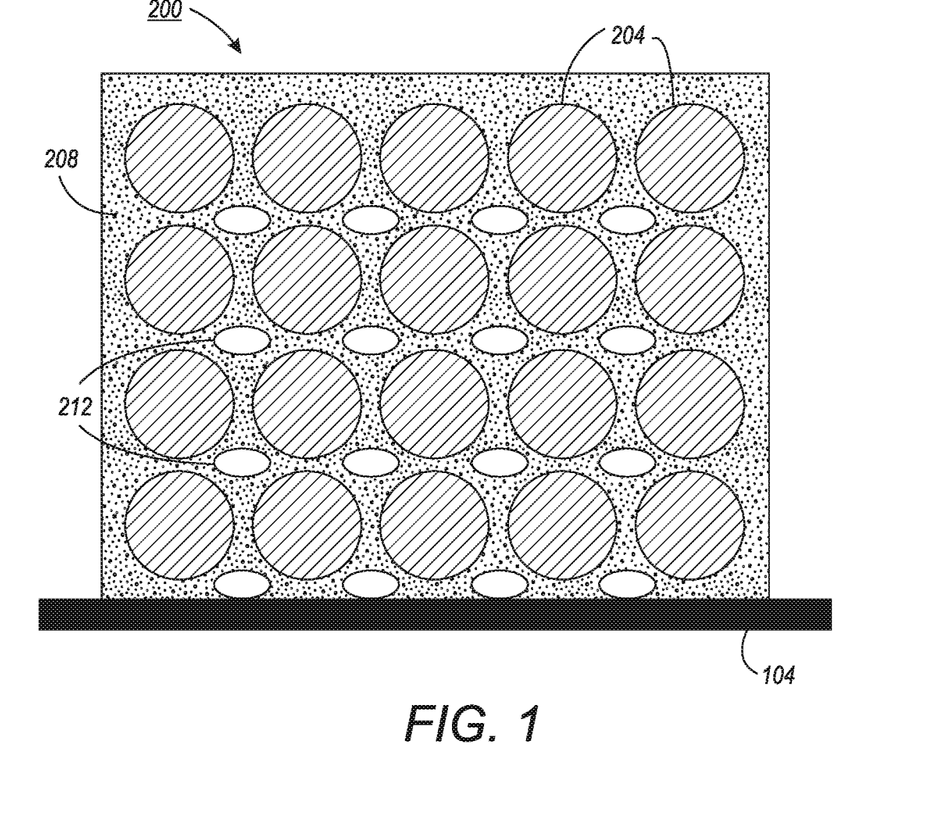
FIG. 1 shows a side view of the block shown in FIG. 8 having a plurality of fluid paths in the support material.

As shown in FIGS. 8 and 9, the block 200 comprises a substantial amount of support material 208 that must be removed to release the parts 204. To hasten the otherwise slow removal process, hollow fluid paths are formed in the support material 208 as the block 200 is formed. FIG. 1 shows the block 200 having a plurality of fluid paths 212 disposed within the support material 208. During removal of the support material 208, a fluid is pumped through the fluid paths 212 to remove at least an interior portion of the support material 208 that surrounds the fluid paths 212. As used in this document, "remove a portion of support material" means the fluid flowing through the fluid path aids in dislodging support material and transports the dislodged material to an exit port in the fluid path. The fluid dislodges the support material by dissolving, melting, or breaking away the support material with chemical, thermal, or mechanical interaction or a combination of these mechanisms. The fluid paths 212 can be configured in any of a variety of ways such that the fluid paths 212 at least have an inlet and an outlet to allow fluid to be pumped through the fluid paths 212.

Figure 2A:
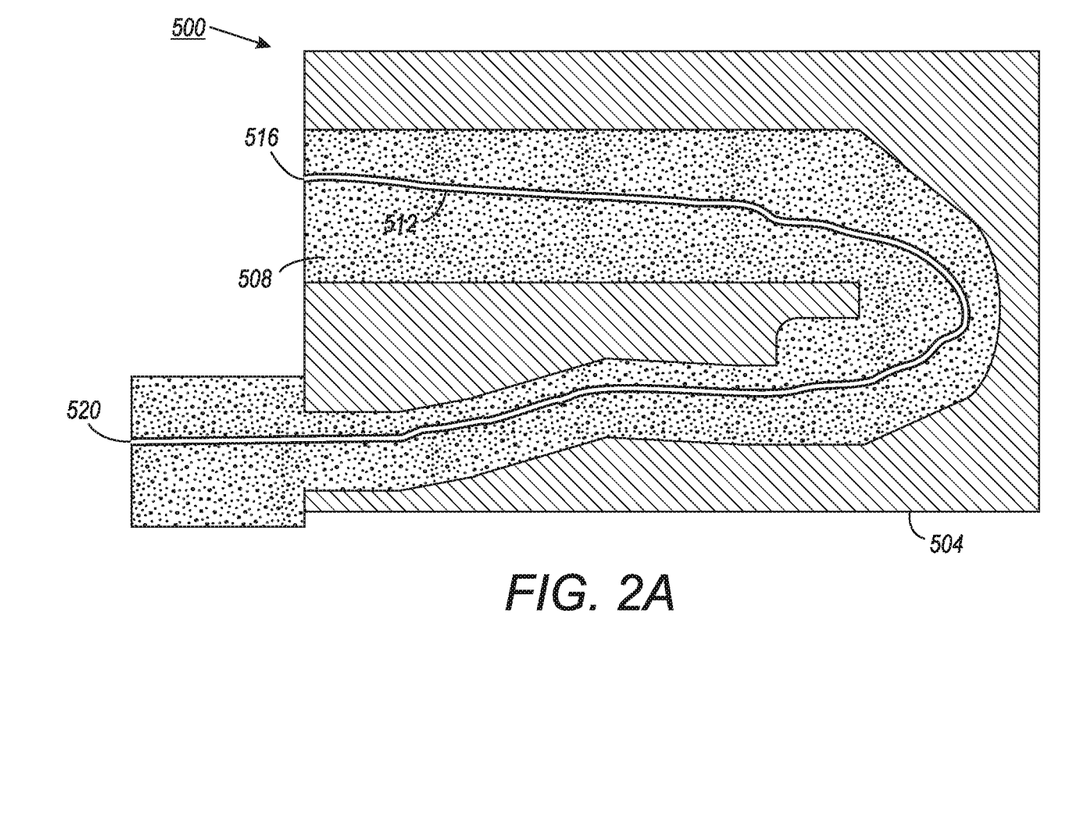
FIGS. 2A and 2B show a removal of support material using fluid paths in the support material.
Figure 2B:
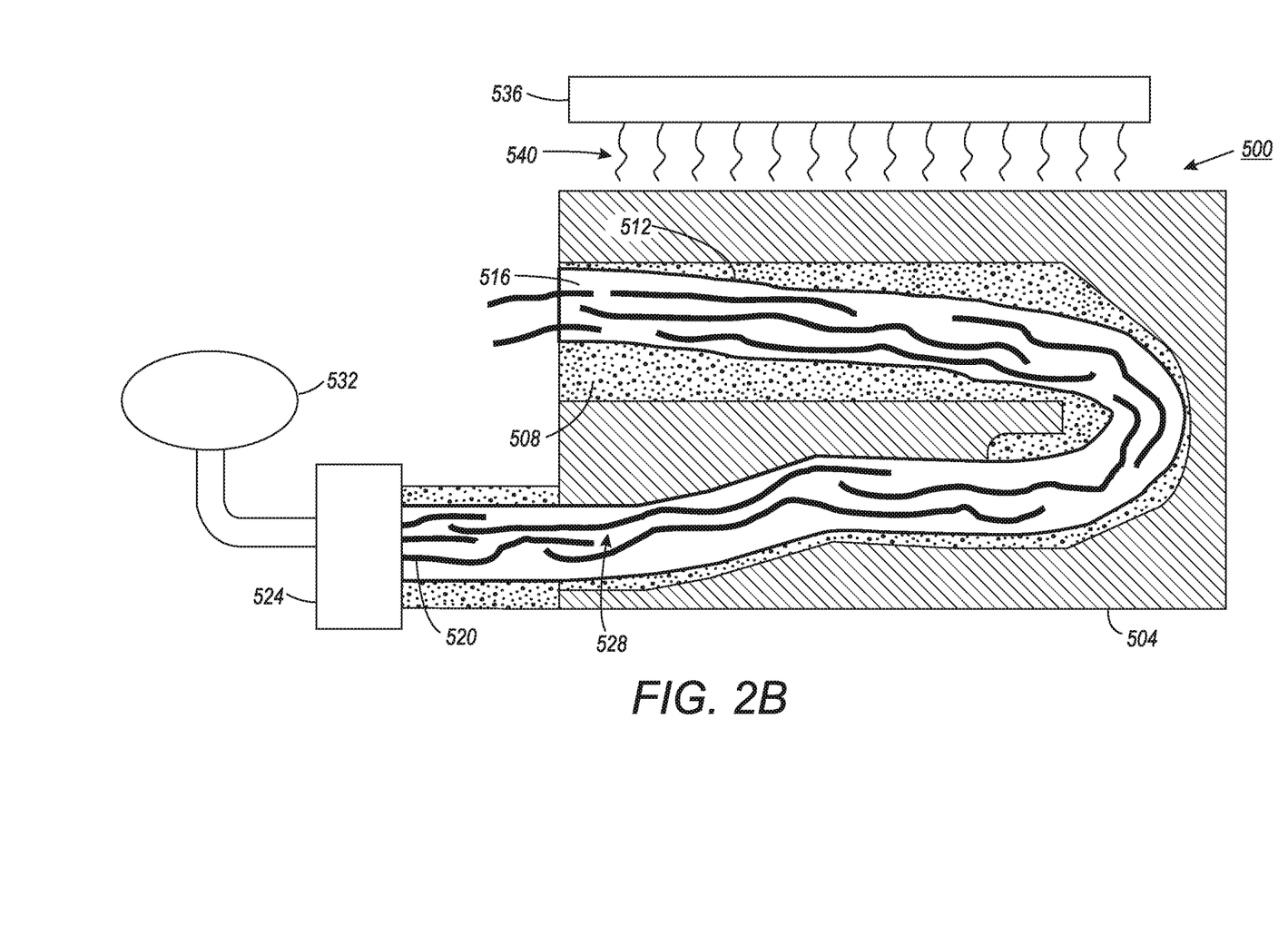

FIGS. 2A and 2B demonstrate in further detail how fluid paths in support material enable quick removal of the support material. FIGS. 2A and 2B show a block 500. The block 500 comprises a part 504 and support material 508. The support material 508 has a fluid path 512 disposed therein. The fluid path 512 has an inlet 520 and an outlet 516. As used herein, the terms "inlet" and "outlet" refer to openings in the body of support material 508 that connect a fluid path 512 to an area surrounding the block 500 and via which a fluid can flow through the support material 508. In practice, structural difference may not exist between an "inlet" and an "outlet" in the body of the support material 508. However, in the embodiment shown, the inlet 520 has a protrusion adapted for connection to a pump 524. In one embodiment, the inlet 520 comprises some build material, as well as support material, to enable removal of the support material 508 prior to disintegration of the protrusion of the inlet 520.

After the block 500 is completed, a fluid is pumped through the fluid path 512 to remove at least an inner portion of the support material 508. In one embodiment, an actuator, such as a pump 524, is operatively connected to the inlet 520 to pump a fluid 528 through the fluid path 512. The pump 524 is operatively connected to a fluid source 532, which is configured to provide the fluid 528 to the pump 524. The pump 524 receives the fluid 528 from the fluid source 532 and pumps the fluid 528 into the inlet 520. The fluid 528 flows through the fluid path 512 until it exits the outlet 516. As the fluid 528 flows through the fluid path 512, the fluid 528 erodes, dissolves, or melts at least an inner portion of the support material 508 and released parts of the support material 508 are carried by the fluid 528 out of the outlet 516. In one embodiment, the fluid 528 is simply water. However, in other embodiments, the fluid 528 can comprise other chemicals that are configured to aid in the removal of the support material 508.

In one embodiment, the fluid 528 is heated to aid in the removal of the support material 508 from the block 200. For some types of support material, the fluid 528 is more effective at removing the support material 508 when it is heated. In one embodiment, the fluid 528 is heated as it flows within the fluid channels of the block 500. Particularly, in one embodiment, a microwave radiator 536 configured to direct microwave radiation 540 onto the block 500 as the fluid 528 passes through the fluid paths of the block 500.

Figure 3:
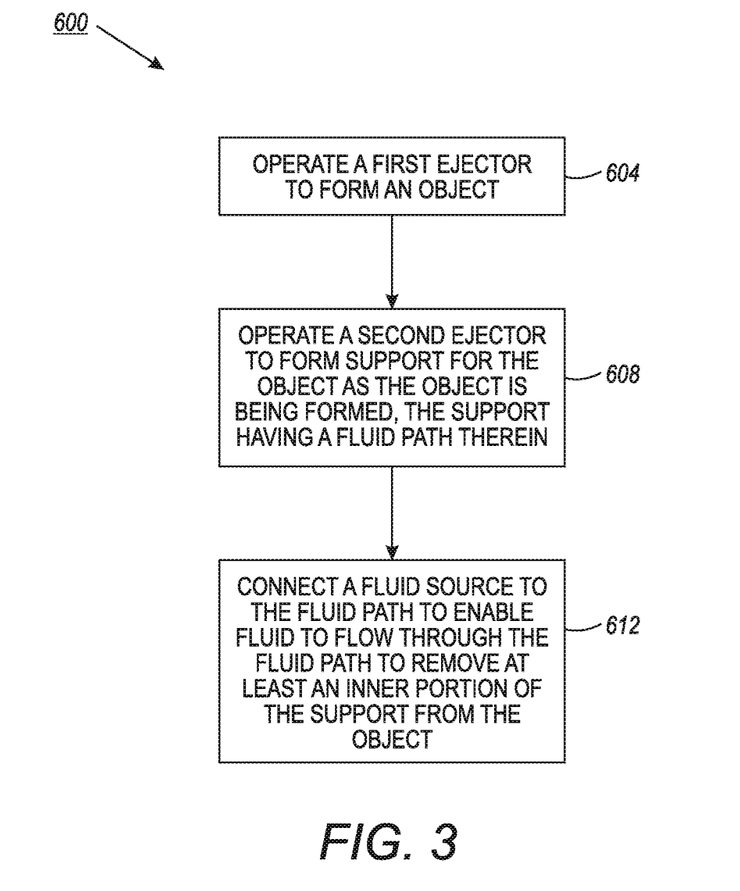
FIG. 3 shows a method of manufacturing a three-dimensional object.

A method 600 for operating a three-dimensional object printer is shown in FIG. 3. In the description of the method, statements that the method is performing some task or function refers to a controller or general purpose processor executing programmed instructions stored in non-transitory computer readable storage media operatively connected to the controller or processor to manipulate data or to operate one or more components in the printer to perform the task or function. The controller 120 of the printer 100 noted above can be such a controller or processor. Alternatively, the controller can be implemented with more than one processor and associated circuitry and components, each of which is configured to form one or more tasks or functions described herein.

When the method 600 is performed, it begins by operating a first ejector to form an object (block 604). Particularly, the controller 120 operates the first plurality of ejectors of the ejector head 108 to eject drops of a build material toward the platen 104 to form an object, such as the plurality of parts 204. Additionally, the method 600 operates a second ejector to form support for the object as the object is being formed, the support having at least one fluid path therein (block 608). Particularly, the controller 120 operates the second plurality of ejectors of the ejector head 108 to eject drops of a support material toward the platen 104 to form support material 208 for the plurality of parts 204. During the formation of the support material 208, the controller 120 operates the second plurality of ejectors to form the fluid paths 212 within the support material 208. The processes of block 604 and block 608 are performed iteratively and simultaneously until the block 200 is completely formed having the parts 204 and the support material 208 and fluid paths 212 between each of the parts 204.

In one embodiment, prior to performing the processes of block 604 and 608, the controller 120 is configured to automatically add fluid paths in support material. Particularly, the controller 120 receives image data from memory or from a data connection. The controller 120 modifies the received image data to include image data corresponding to one or more fluid paths to the support material.

Next, the method 600 connects a fluid source to the fluid path to enable fluid to flow through the fluid path to remove at least an inner portion of the support from the object (block 612). Particularly, at least one actuator, which may be similar to the pump 524, is connected to an inlet of at least one of the fluid paths 212. The actuator is operably connected to a fluid source, which may be similar to the fluid source 532, and is configured to pump a fluid through though the fluid paths 212. In one embodiment, the actuator is configured to periodically reverse the flow direction of the fluid through the fluid paths 212. As the fluid is pumped through the fluid paths 212, portions of the support material 208 are removed from the parts 204. In some embodiments, the fluid is pumped through the fluid paths 212 until all of the support material 208 is removed from the parts 204. In some embodiments, the flow of the fluid is controlled to manage a heat of the build material that forms the parts 204. Particularly, the fluid may be pumped faster to help cool the parts 204. In one embodiment, an temperature sensor is provided to measure a temperature of the parts 204.

Figure 4:
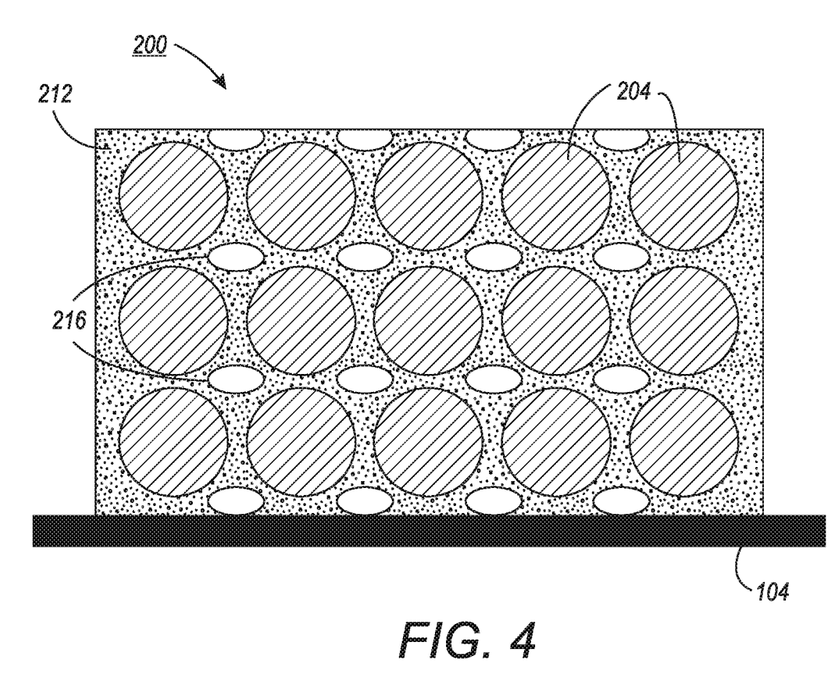
FIG. 4 shows the block of FIG. 8 having one row of parts removed.

In some embodiments, fluid is only pumped through a portion of the fluid paths of a block. FIG. 4 shows the block 200 after having fluid pumped through only a top row of the fluid paths 212. Since the parts 204 are essentially arranged in a three-dimensional matrix, evenly spaced throughout the block 200, the parts 204 can be removed one row at a time. Particularly, fluid is pumped through a top row of the fluid paths 212 to remove a top row of the parts 204. Then, the process is performed iteratively to sequentially remove each row of the parts 204 individually.

Figure 5:
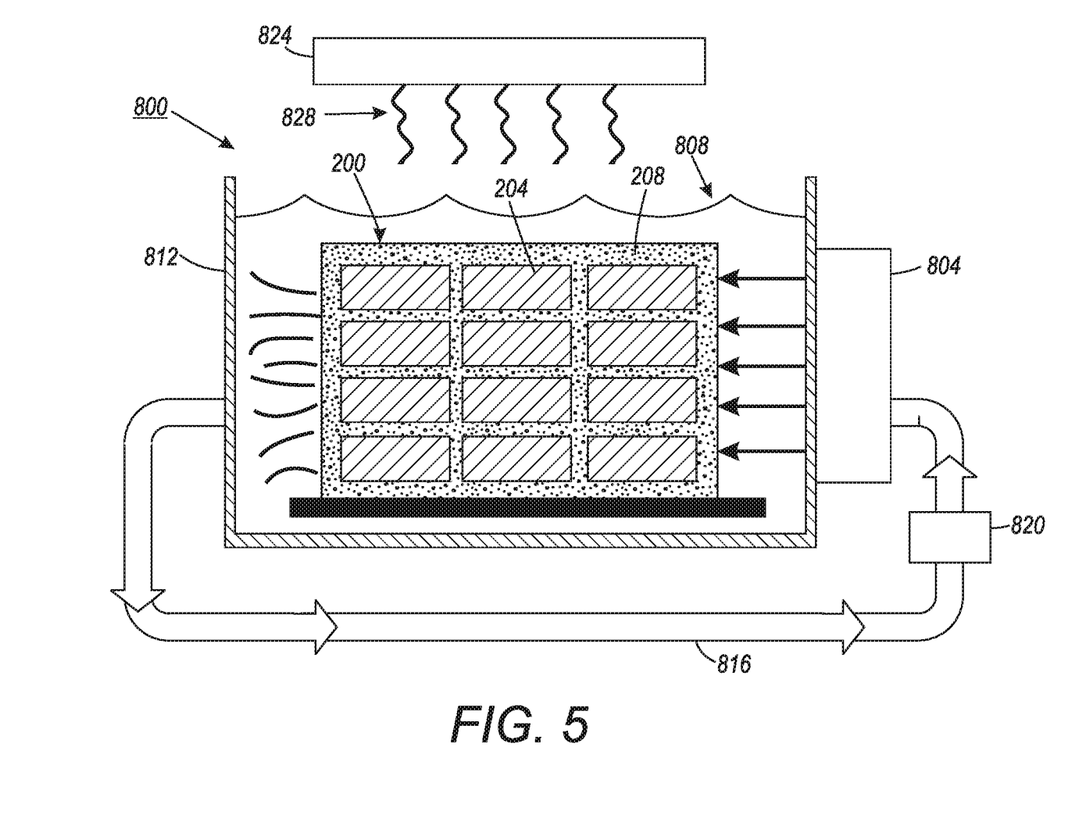
FIG. 5 shows a washing station for removing support material from a block.

In some embodiments, prior to performing the processes of block 612, the block 200 and, optionally, the platen 104 are removed from the printer 100 and placed inside a washing station that is configured to pulse a fluid through the fluid paths 212. FIG. 5 shows a washing station 800. The washing station 800 includes a pump 804 that pulses a fluid 808 through the support material 208 of the block 200. In one embodiment, the washing station includes a reservoir 812 that contains the fluid. The block 200 is placed in the reservoir 812 and the pump 804 circulates the fluid through support material 208 of the block 200. In one embodiment, the washing station has a channel 816 that enables the fluid 808 to circulate from the reservoir 812 back to the pump. However, in other embodiments, the washing station 800 does not include a reservoir and may be configured to pump fluid through the support material 208 of the block 200 in other ways.

In one embodiment, the fluid 808 is heated to aid in the removal of the support material 208 from the block 200. In some embodiments, the fluid 808 is externally heated before being pumped through the fluid paths of the block 200. Particularly, in one embodiment, the washing station 800 includes a heating device 820 arranged in the channel 816 and configured to heat the fluid 808 before it is pumped into the reservoir 812 by the pump 804. In other embodiments, the fluid 808 is heated as it flows within the fluid channels of the block 200. Particularly, in one embodiment, the washing station 800 includes a microwave radiator 824 configured to direct microwave radiation 828 onto the block 200 as the fluid 808 passes through the fluid paths of the block 200.

In embodiments having the microwave radiator 824, the fluid 808 is configured to have a high dielectric strength relative to a dielectric strength of the build material in the block 200. In one embodiment, the fluid 808 is water or a water-based solution. When the block 200 is subjected to the microwave radiation 828, the fluid 808 absorbs a majority of the microwave radiation 828, and the amount of the microwave radiation 828 that is absorbed into the build material is minimized, which may damage the parts 204.

In some embodiments, the support material 208 is also configured to have a high dielectric strength relative to the dielectric strength of the build material in the block 200. In some embodiments, the support material 208 is infused with a particle additive having a high dielectric strength. In some embodiments, the particle additive comprises ferrous nanoparticles but can, in principle, comprise any additive having a high dielectric strength. When the block 200 is subjected to the microwave radiation 828, the support material 208 and the fluid 808 absorb a majority of the microwave radiation 828, thereby speeding the removal of the support material 208 from the parts 204.

Figure 6:
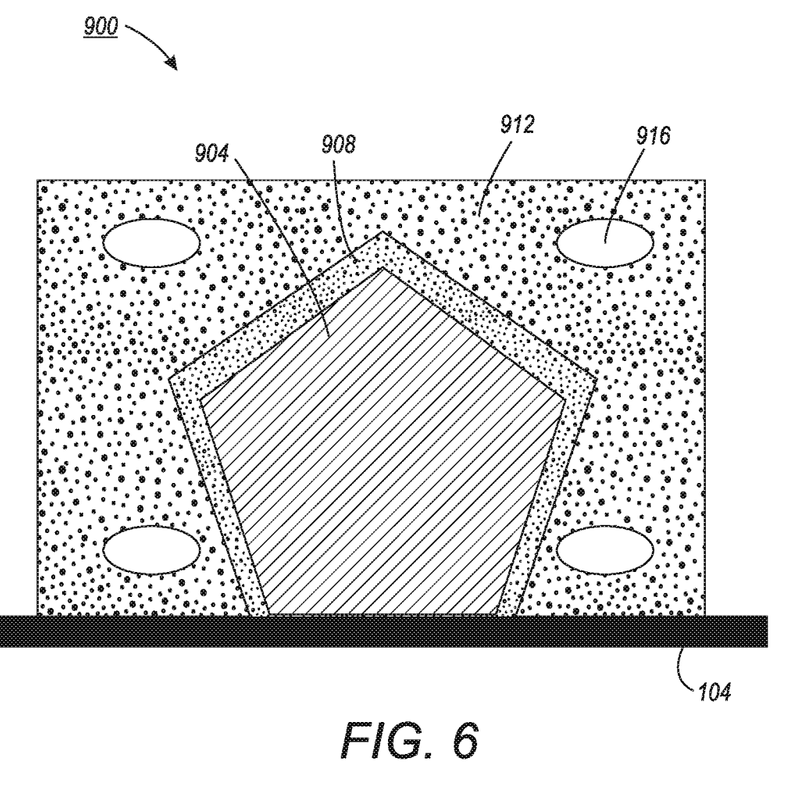
FIG. 6 shows block having types of support material having different dielectric strengths.

In some embodiments, the ejector head has a first plurality of ejectors configured to eject a build material, a second plurality of ejectors configured to eject a first type of support material, and a third plurality of ejectors configured to eject a second type of support material. The second type of support material has a higher dielectric strength than the first type of support material. In one embodiment, the second type of support material comprises a particle additive as described above. FIG. 6 shows a block 900 having two types of support material. The block 900 has a part 904. The part 904 is surrounded by a support material. The support material has a first portion 908 comprising the first type of support material and a second portion 912 comprising the second type of support material. Fluid paths 916 are formed within the second portion 908 of the support material. When the block 900 is subjected to the microwave radiation 828, the fluid 808 and second portion 912 of the support material absorb a majority of the microwave radiation 828. The first portion 908 of the support material protects the part 904 from the heat absorbed by the fluid 828 and the second portion of the support material, which minimizes damage to the part 904.

It will be appreciated that variants of the above-disclosed and other features and functions, or alternatives thereof, may be desirably combined into many other different systems, applications or methods. Various presently unforeseen or unanticipated alternatives, modifications, variations, or improvements therein may be subsequently made by those skilled in the art, which are also intended to be encompassed by the following claims.

What is claimed is:

1. A three-dimensional object printing system comprising:
a platen;
an ejector head having a first ejector configured to eject a first material towards the platen and a second ejector configured to eject a second material towards the platen;
a fluid source;
an actuator operatively connected to the fluid source; and
a controller operatively connected to the ejector head and the actuator, the controller being configured to (i) operate the first ejector to eject the first material towards the platen to form an object, (ii) operate the second ejector to eject the second material towards the platen to form a support for portions of the object, at least one portion of the support having a body with at least one fluid path that enables fluid to flow through the body of the at least one portion of the support and contact a portion of the second material that formed the support, (iii) operate the actuator to pump from the fluid source through the at least one fluid path to cause a fluid to flow through the at least one fluid path and contact the second material that formed the support and then exit from another end of the at least one fluid path to remove at least an inner portion of the at least one portion of the support from the object, and (iv) operate the actuator to reverse a flow direction of the fluid through the at least one fluid path periodically.

2. The three-dimensional object printing system of claim 1, the controller being further configured to:
receive image data that represents the object and the support;
modify the image data to add the at least one fluid path to the at least one portion of the support;
operate the first ejector using the modified image data to form the object; and
operate the second ejector using the modified image data to form the support.

3. The three-dimensional object printing system of claim 1 further comprising:
a heating device configured to heat the fluid that flows through the at least one fluid path.

4. The three-dimensional object printing system of claim 3 wherein the heating device is configured to heat the fluid before the fluid enters the at least one fluid path.

5. The three-dimensional object printing system of claim 3 wherein the heating device is a microwave radiator configured to direct microwave radiation towards the support and the fluid as the fluid flows through the at least one fluid path to heat the fluid within the at least one fluid path within the support.

6. The three-dimensional object printing system of claim 3 further comprising:
a temperature sensor that is configured to generate a signal indicative of a temperature of the fluid flowing through the at least one fluid path; and
the controller is further configured to operate the heating device using the signal generated by the temperature sensor to maintain the temperature of the fluid flowing through the at least one fluid path below a predetermined temperature threshold.

7. The three-dimensional object printing system of claim 6, the controller being further configured to:
modify the image data to include a protrusion in one end of the at least one fluid path; and
operate the second ejector to form the at least one fluid path in the support with the protrusion in the one end of the at least one fluid path, the protrusion being formed to couple the actuator to the at least one fluid path.

8. The three-dimensional object printing system of claim 7 wherein the actuator is a pump.

9. The three-dimensional object printing system of claim 8 wherein the at least one fluid path includes two fluid paths; and the controller is further configured to:
operate the actuator to move fluid from the fluid source through the two fluid paths independently.

* * * * *